(12) United States Patent
Mallary et al.

(10) Patent No.: US 9,034,492 B1
(45) Date of Patent: *May 19, 2015

(54) SYSTEMS AND METHODS FOR CONTROLLING DAMPING OF MAGNETIC MEDIA FOR HEAT ASSISTED MAGNETIC RECORDING

(71) Applicant: WD Media, Inc., San Jose, CA (US)

(72) Inventors: Michael L. Mallary, Sterling, MA (US); Gerardo A. Bertero, Redwood City, CA (US); Kumar Srinivasan, San Mateo, CA (US)

(73) Assignee: WD Media, LLC, San Jose, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 13/740,115

(22) Filed: Jan. 11, 2013

(51) Int. Cl.
*G11B 5/65* (2006.01)
*G11B 5/62* (2006.01)
*G11B 5/64* (2006.01)
*G11B 5/855* (2006.01)

(52) U.S. Cl.
CPC .. *G11B 5/62* (2013.01); *G11B 5/65* (2013.01); *G11B 5/855* (2013.01); *G11B 5/645* (2013.01)

(58) Field of Classification Search
None
See application file for complete search history.

(56) References Cited

U.S. PATENT DOCUMENTS

| | | |
|---|---|---|
| 4,833,560 A | 5/1989 | Doyle |
| 6,013,161 A | 1/2000 | Chen et al. |
| 6,063,248 A | 5/2000 | Bourez et al. |
| 6,068,891 A | 5/2000 | O'Dell et al. |
| 6,086,730 A | 7/2000 | Liu et al. |
| 6,099,981 A | 8/2000 | Nishimori |
| 6,103,404 A | 8/2000 | Ross et al. |
| 6,117,499 A | 9/2000 | Wong et al. |
| 6,136,403 A | 10/2000 | Prabhakara et al. |
| 6,143,375 A | 11/2000 | Ross et al. |
| 6,145,849 A | 11/2000 | Bae et al. |
| 6,146,737 A | 11/2000 | Malhotra et al. |
| 6,149,696 A | 11/2000 | Jia |
| 6,150,015 A | 11/2000 | Bertero et al. |
| 6,156,404 A | 12/2000 | Ross et al. |
| 6,159,076 A | 12/2000 | Sun et al. |
| 6,164,118 A | 12/2000 | Suzuki et al. |
| 6,200,441 B1 | 3/2001 | Gornicki et al. |
| 6,204,995 B1 | 3/2001 | Hokkyo et al. |
| 6,206,765 B1 | 3/2001 | Sanders et al. |
| 6,210,819 B1 | 4/2001 | Lal et al. |
| 6,216,709 B1 | 4/2001 | Fung et al. |
| 6,221,119 B1 | 4/2001 | Homola |

(Continued)

OTHER PUBLICATIONS

Bailey, William, Pavel Kabos, Frederick Mancoff and Stephen Russek, Control of Magnetization Dynamics in Ni18Fe19 Thin Films Through the Use of Rare-Earth Dopants, IEEE Transactions of Magnetics, vol. 37, No. 4, Jul. 2011, pp. 1749-1754.

(Continued)

*Primary Examiner* — Kevin Bernatz

(57) ABSTRACT

Systems and methods for controlling the damping of magnetic media for heat assisted magnetic recording are provided. One such system includes a heat sink layer, a growth layer on the heat sink layer, a magnetic recording layer on the growth layer, where the growth layer is configured to facilitate a growth of a preselected crystalline structure of the magnetic recording layer, and a capping magnetic recording layer on the magnetic recording layer, the capping recording layer including a first material configured to increase a damping constant of the capping recording layer to a first preselected level.

42 Claims, 3 Drawing Sheets

(56) References Cited

U.S. PATENT DOCUMENTS

| | | | |
|---|---|---|---|
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,649,254 B1 * | 11/2003 | Victora et al. ............... 428/212 |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,830,824 B2 | 12/2004 | Kikitsu et al. |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,354,664 B1 | 4/2008 | Jiang et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |
| 8,218,260 B2 | 7/2012 | Iamratanakul et al. |
| 8,228,636 B2 | 7/2012 | Lomakin et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,351,309 B2 * | 1/2013 | Kanbe et al. ............... 369/30.03 |

(56) References Cited

U.S. PATENT DOCUMENTS

| | | |
|---|---|---|
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,051 B1 * | 3/2013 | Hellwig et al. ............... 427/131 |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,542,569 B2 * | 9/2013 | Kanbe et al. .................. 369/288 |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,576,672 B1 * | 11/2013 | Peng et al. .................. 369/13.14 |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 * | 12/2013 | Chernyshov et al. ....... 369/13.33 |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 * | 2/2014 | Mallary et al. ................ 428/828 |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B2 | 4/2014 | Sun et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,795,765 B2 | 8/2014 | Koike et al. |
| 8,795,790 B2 | 8/2014 | Sonobe et al. |
| 8,795,857 B2 | 8/2014 | Ayama et al. |
| 2002/0060883 A1 | 5/2002 | Suzuki |
| 2003/0022024 A1 | 1/2003 | Wachenschwanz |
| 2004/0022387 A1 | 2/2004 | Weikle |
| 2004/0132301 A1 | 7/2004 | Harper et al. |
| 2004/0137277 A1 * | 7/2004 | Iwasaki et al. ......... 428/694 TM |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0129985 A1 | 6/2005 | Oh et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2005/0274221 A1 | 12/2005 | Ziani et al. |
| 2006/0147758 A1 | 7/2006 | Jung et al. |
| 2006/0154110 A1 * | 7/2006 | Hohlfeld et al. ............... 428/823 |
| 2006/0181697 A1 | 8/2006 | Treves et al. |
| 2006/0207890 A1 | 9/2006 | Staud |
| 2007/0003792 A1 * | 1/2007 | Covington et al. ........... 428/812 |
| 2007/0070549 A1 | 3/2007 | Suzuki et al. |
| 2007/0245909 A1 | 10/2007 | Homola |
| 2008/0075845 A1 | 3/2008 | Sonobe et al. |
| 2008/0093760 A1 | 4/2008 | Harper et al. |
| 2009/0061259 A1 | 3/2009 | Lee et al. |
| 2009/0117408 A1 | 5/2009 | Umezawa et al. |
| 2009/0136784 A1 | 5/2009 | Suzuki et al. |
| 2009/0155627 A1 | 6/2009 | Berger et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0073813 A1 | 3/2010 | Dai et al. |
| 2010/0124672 A1 | 5/2010 | Thangaraj et al. |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2010/0309577 A1 | 12/2010 | Gao et al. |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0194942 A1 * | 8/2012 | Hohlfeld et al. ................. 360/59 |
| 2012/0196619 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251845 A1 * | 10/2012 | Wang et al. ................... 428/827 |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |

(56) References Cited

U.S. PATENT DOCUMENTS

| | | |
|---|---|---|
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0288079 A1* | 10/2013 | Chang et al. .................. 428/828 |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |
| 2014/0151360 A1 | 6/2014 | Landdell et al. |

OTHER PUBLICATIONS

Krivoski, Pavol, Sangita S. Kalarickal, Nan Mo, Stella We and Carl E. Patton, "Ferromagnetic Resonance and Damping in Granular Co—Cr Films with Perpendicular Anisotropy," Applied Physics Letters 95, American Institute of Physics, May 2009, 3 pages.

Nedo and Hitachi Presentation.

Nedo, Hitachi and Hitachi GST, "Microwave-Assisted Magnetic Recording for Net Gen HDD," StorageNewsletter.com, Nov. 2010.

Zhu, Jiang-Gang, Xiaochun Zhu and Yuhui Tang, "Microwave Assisted Magnetic Recording," IEEE Transaction on Magnetics, vol. 44, No. 1, January, pp. 125-131.

* cited by examiner

SYSTEMS AND METHODS FOR CONTROLLING DAMPING OF MAGNETIC MEDIA FOR HEAT ASSISTED MAGNETIC RECORDING

FIELD

The present invention relates to magnetic media used in storage systems, and more specifically to systems and methods for controlling the damping of magnetic media for heat assisted magnetic recording.

BACKGROUND

Perpendicular magnetic recording (PMR) is approaching the maximum areal density (AD) that can be achieved with multi-layer media in which the magnetic anisotropy field (Hk) is graded from a low value in the top layer to a high value in the lowest layer. Therefore alternate recording technologies such as heat assisted magnetic recording (HAMR), which may encompass or be synonymous with additional technologies such as energy assisted magnetic recording (EAMR), are being investigated to achieve higher areal density.

HAMR technologies are intended to address the areal density problem. In these assisted recording systems, a laser beam is delivered through an optical waveguide and interacts with a near field transducer (NFT) that absorbs part of the optical energy and forms a very strong localized electromagnetic field in the near field region. When the localized electromagnetic field is close enough to the recording medium, the recording medium absorbs part of the localized electromagnetic field energy and is thereby heated up thermally, which helps to realize the magnetic recording process.

Recent atomistic calculations associated with HAMR media switching have revealed a relatively severe fast cooling rate problem for HAMR media. More specifically, for the fast cooling rates needed to support HAMR in high speed applications, theoretical results have revealed that conventional HAMR media experience fluctuations in magnetization and anisotropy during fast cooling which will cause grains to flip when they should not and to not flip when they should. This will lead to wide and noisy transitions with poor bit error rate performance. In addition, this will lead to DC-like noise proximate to the transitions but not at them, which is due to the associated magnetization and anisotropy fluctuations. As such, an improved magnetic media for use in HAMR applications that addresses these problems is desirable.

SUMMARY

Aspects of the invention relate to systems and methods for controlling the damping of magnetic media for heat assisted magnetic recording. In one embodiment, the invention relates to a magnetic media structure for heat assisted magnetic recording, the media structure including a heat sink layer, a growth layer on the heat sink layer, a magnetic recording layer on the growth layer, where the growth layer is configured to facilitate a growth of a preselected crystalline structure of the magnetic recording layer, and a capping magnetic recording layer on the magnetic recording layer, the capping recording layer including a first material configured to increase a damping constant of the capping recording layer to a first preselected level.

In another embodiment, the invention relates to a magnetic media structure for heat assisted magnetic recording, the media structure including a heat sink layer, a growth layer on the heat sink layer, a magnetic recording underlayer on the growth layer, the underlayer including a first material configured to increase a damping constant of the underlayer to a first preselected level, and a magnetic recording layer on the underlayer, where the growth layer and the underlayer are configured to facilitate a growth of a preselected crystalline structure of the magnetic recording layer.

In yet another embodiment, the invention relates to a method for increasing a damping constant of a magnetic media structure for heat assisted magnetic recording, the method including providing a heat sink layer, providing a growth layer on the heat sink layer, providing a magnetic recording layer on the growth layer, where the growth layer is configured to facilitate a growth of a preselected crystalline structure of the magnetic recording layer, and providing a capping magnetic recording layer on the magnetic recording layer, the capping recording layer including a first material configured to increase a damping constant of the capping recording layer to a first preselected level.

In still yet another embodiment, the invention relates to a method for increasing a damping constant of a magnetic media structure for heat assisted magnetic recording, the method including providing a heat sink layer, providing a growth layer on the heat sink layer, providing a magnetic recording underlayer on the growth layer, the underlayer including a first material configured to increase a damping constant of the underlayer to a first preselected level, and providing a magnetic recording layer on the underlayer, where the growth layer and the underlayer are configured to facilitate a growth of a preselected crystalline structure of the magnetic recording layer.

DETAILED DESCRIPTION

Figure 1:
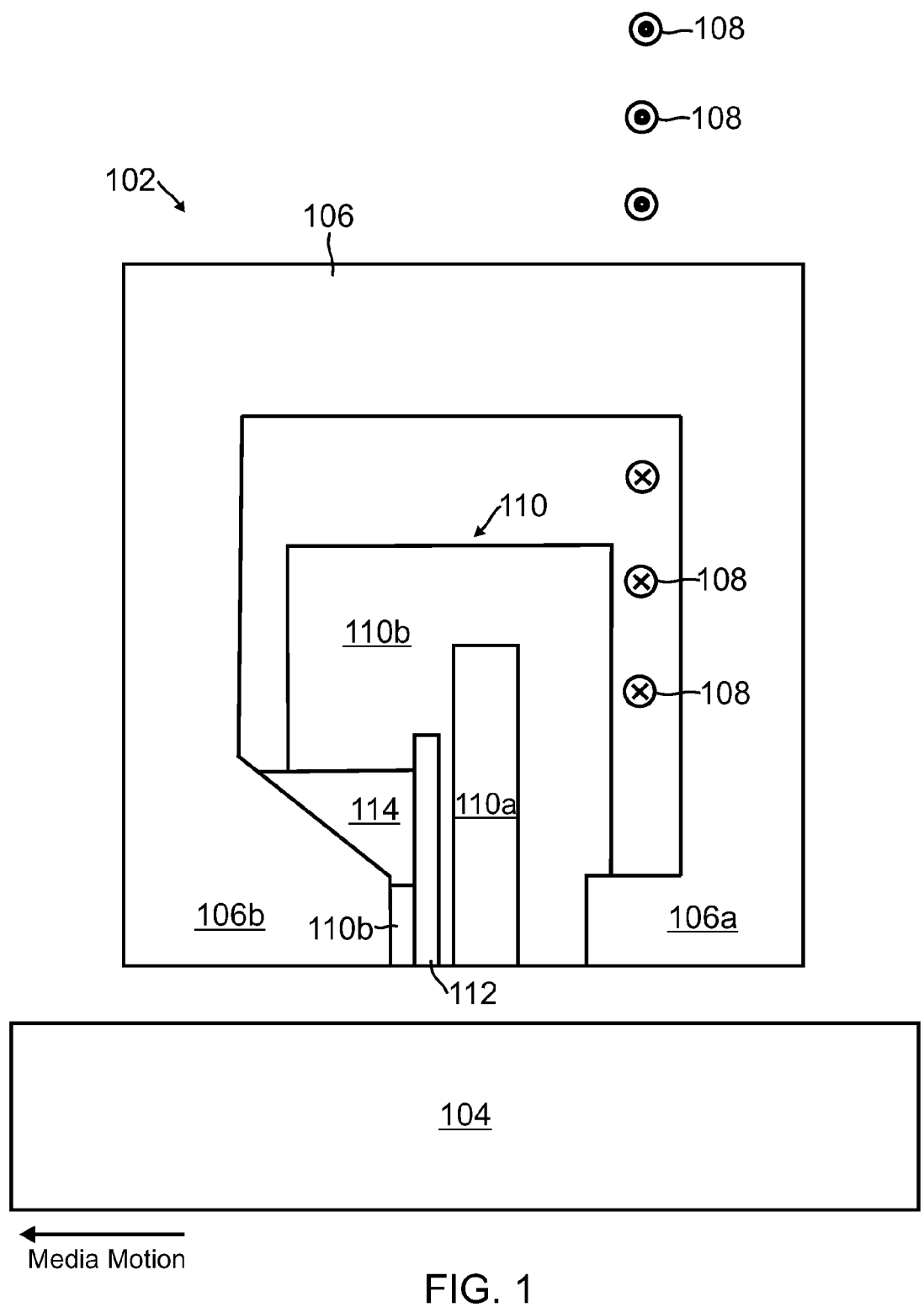
FIG. 1 is a side view of a heat assisted magnetic recording (HAMR) system including a read/write head positioned above a damped magnetic media in accordance with one embodiment of the invention.

Referring now to the drawings, embodiments of systems and methods for controlling the damping of magnetic media for heat assisted magnetic recording (HAMR) are illustrated. The systems can include a damped magnetic media with a continuous or non-continuous doped capping layer positioned on the recording layer, or a damped magnetic media with a continuous or non-continuous doped underlayer positioned beneath the recording layer, that can be used in conjunction with a HAMR read/write head. The methods can be used to form the various embodiments of the damped magnetic media. The doped capping layer or doped underlayer includes a first material (e.g., rare earth dopant) that is configured to increase a damping constant of the capping layer to a first preselected level. In many embodiments, a heat sink layer and growth layer are positioned beneath the recording layer and the doped capping layer or doped underlayer.

While not bound by any particular theory, the doped capping layer or doped underlayer can sharpen transitions and allow for faster cooling for higher data rates, higher thermal gradients, and higher linear density. It may also suppress certain types of noise. In effect, the doped capping layer or doped underlayer can be exchange coupled to the recording grains, and can thus absorb magnons (e.g., quantized magnetic fluctuations) that are generated at high temperatures and persist to low temperatures because the intrinsic damping of conventional HAMR media is low.

FIG. 1 is a side view of a heat assisted magnetic recording (HAMR) system 100 including a read/write head 102 positioned above a damped magnetic media 104 in accordance with one embodiment of the invention. The head 102 includes a write pole 106 consisting of a leading write pole 106a and a trailing write pole 106b, where a portion of the write pole 106 is enclosed by a pancake style write coil 108. The head 102 further includes a waveguide 110 consisting of a waveguide core 110a surrounded by a waveguide cladding 110b. The head 102 also includes a near field transducer (NFT) 112 positioned within the waveguide cladding 110b, and a NFT heat sink 114 to dissipate heat from the NFT 112. The operation of HAMR read/write heads and their components is well known in the art, and head 102 can be operated accordingly.

The damped magnetic media 104 includes a doped capping layer or doped underlayer made of a first material (e.g., rare earth dopant) that is configured to increase a damping constant of the capping layer to a first preselected level. In several embodiments, the first material is a rare earth dopant such as Ho. In one such case, the concentration of Ho is greater than about 0.5 percent. In other embodiments, the first material is a rare earth dopant that includes one or more materials from the group consisting of Pr, Nd, Pm, Sm, Eu, Gd, Tb, Dy, Ho, Er, Tm, Yb, Lu, Hf, or other suitable dopants.

Figure 2A:
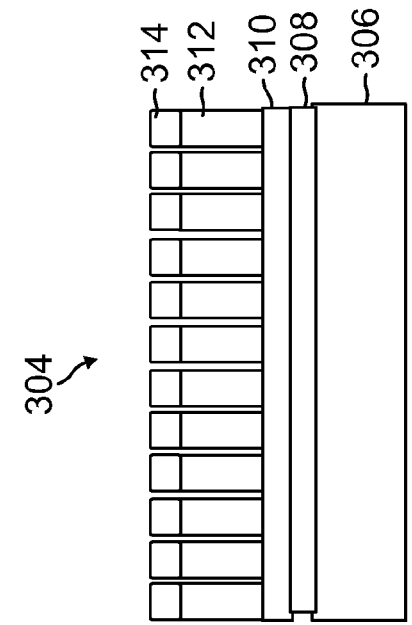
FIG. 2a is a side view of a damped magnetic media with a continuous doped capping layer positioned on a magnetic recording layer that can be used in conjunction with the read/write head of FIG. 1 in accordance with one embodiment of the invention.

FIG. 2a is a side view of a damped magnetic media 204 with a continuous doped capping layer 214 positioned on a magnetic recording layer 212 that can be used in conjunction with the read/write head of FIG. 1 in accordance with one embodiment of the invention. The damped magnetic media 204 has a stacked multi-layer structure with a bottom heat sink layer 206, a thermal resistor layer 208 on the heat sink layer 206, a growth layer 210 on the thermal resistor layer 208, the recording layer 212 on the growth layer 210, and the continuous doped capping layer 214 on the recording layer 212. In some embodiments, an additional layer, such as an exchange coupling layer, is positioned between the doped capping layer 214 (e.g., capping magnetic recording layer) and the magnetic recording layer 212. In some embodiments, the heat sink 206 is on another additional layer (e.g., a substrate or a soft magnetic underlayer on a substrate).

The recording layer 212 consists of a number of discrete grains oriented in a vertical direction and can be made of FePt, CoCrPt, CoPt, CoPtNi, and/or other suitable materials. In several embodiments, the recording layer 212 consists of one or more materials suitable to provide an $L1_0$ crystalline structure. The doped capping layer 214 is made of a first material (e.g., a magnetic alloy with a rare earth dopant) that is configured to increase a damping constant of the capping layer 214 to a first preselected level. In one embodiment, the first preselected level is about 20% and corresponds to an overall damping of the media 204 of about 5%. In several embodiments, the first material is a rare earth dopant such as Ho or Ho oxide. In one such case, the concentration of Ho in the capping layer 214 is greater than about 0.5 percent. In other embodiments, the first material is a rare earth dopant that includes one or more materials from the group consisting of Pr, Nd, Pm, Sm, Eu, Gd, Tb, Dy, Ho, Er, Tm, Yb, Lu, Hf, or other suitable dopants.

In several embodiments, the first material or doping material is deposited on the grains of the recording layer 212 such that portions of the doping material are disposed between the grains. In one such embodiment, the volume average of damping is segmented such that about one third is contributed by the doped capping layer 214 and about two thirds is contributed by the recording layer 212 (e.g., by the doping material positioned between the grains). In several embodiments, the rare earth dopant for the doped capping layer 214 is selected for its ability to increase intrinsic damping and its capability to avoid disturbing a desired crystalline structure of the recording layer 212 (e.g., $L1_0$ crystalline structure).

The heat sink layer 206 is configured to dissipate heat and is made of one or more high thermal conductivity materials (e.g., an alloy of Cu and/or other thermally conductive materials). The optional thermal resistor layer 208 is configured to resist thermal conduction and is made of one or more materials suited for such (e.g., SiOx, WSe, and/or other suitable materials).

The growth layer 210 is configured to facilitate a growth of a preselected structure (e.g., $L1_0$ crystalline structure or other suitable structure) of the recording layer 212. In several embodiments, the growth layer 210 is made of one or more materials conducive to growing the preselected structure of the recording layer 212, such as MgO and/or other suitable materials. The optional exchange coupling layer positioned between the recording layer 212 and the doped capping layer 214 can be made of Ru and/or other suitable materials as are known in the art.

In several embodiments, the doped capping layer 214 and/or recording layer 212 increase the damping of the magnetic media 204 and therefore sharpen transitions and allow for faster media cooling for higher data rates, higher thermal gradients, and higher linear density while suppressing certain types of undesirable noise.

Figure 2B:
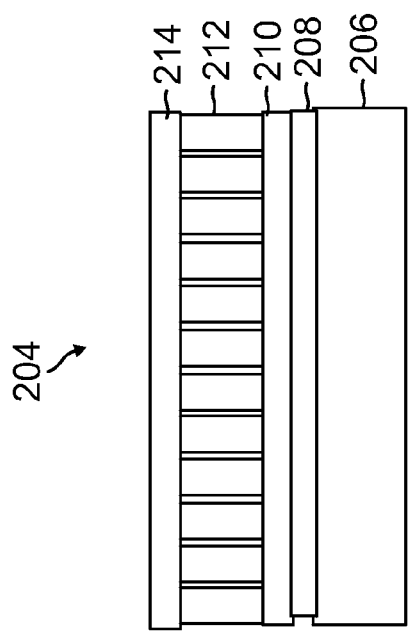
FIG. 2b is a side view of a damped magnetic media with a non-continuous doped capping layer positioned on a magnetic recording layer that can be used in conjunction with the read/write head of FIG. 1 in accordance with one embodiment of the invention.

FIG. 2b is a side view of a damped magnetic media 304 with a non-continuous doped capping layer 314 positioned on a recording layer 312 that can be used in conjunction with the read/write head of FIG. 1 in accordance with one embodiment of the invention. The damped magnetic media 304 has a stacked multi-layer structure with a bottom heat sink layer 306, a thermal resistor layer 308 on the heat sink layer 306, a growth layer 310 on the thermal resistor layer 308, the recording layer 312 on the growth layer 310, and the non-continuous (e.g., discrete) doped capping layer 314 on the recording layer 312. In some embodiments, an additional layer, such as an exchange coupling layer, is positioned between the doped capping layer 314 (e.g., capping magnetic recording layer) and the magnetic recording layer 312.

The recording layer 312 includes a number of discrete grains oriented in a vertical direction and can be made of FePt, CoCrPt, CoPt, CoPtNi, and/or other suitable materials. In several embodiments, the doped capping layer 314 includes a number of discrete grains in vertical correspondence with the grains of the recording layer 312. Similarly, the optional exchange coupling layer can include a number of discrete grains in vertical correspondence with the grains of the recording layer 312. The layers of the damped magnetic media 304 can otherwise function, and be made of the same materials, as described above for the damped magnetic media 204 of FIG. 2a.

Figure 3A:
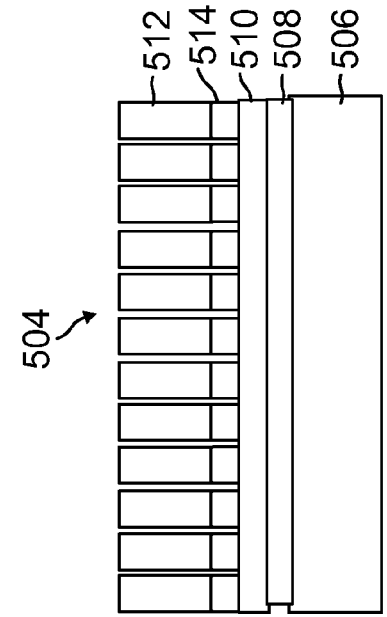
FIG. 3a is a side view of a damped magnetic media with a continuous doped underlayer positioned beneath a magnetic recording layer that can be used in conjunction with the read/write head of FIG. 1 in accordance with one embodiment of the invention.

FIG. 3a is a side view of a damped magnetic media 404 with a continuous doped underlayer 414 positioned beneath a magnetic recording layer 412 that can be used in conjunction with the read/write head of FIG. 1 in accordance with one embodiment of the invention. The damped magnetic media 404 has a stacked multi-layer structure with a bottom heat sink layer 406, a thermal resistor layer 408 on the heat sink layer 406, a growth layer 410 on the thermal resistor layer 408, the continuous doped underlayer 414 on the growth layer 410, and the recording layer 412 on the continuous doped underlayer 414. In some embodiments, the stacked structure further includes a capping layer on the recording layer 412.

The recording layer 412 includes a number of discrete grains oriented in a vertical direction and can be made of FePt, CoCrPt, CoPt, CoPtNi, and/or other suitable materials. In several embodiments, the recording layer 412 is made of one or more materials providing for an $L1_0$ crystalline structure. The doped underlayer 414 is made of a first material (e.g., rare earth dopant) that is configured to increase a damping constant of the capping layer 414 to a first preselected level and to facilitate a growth of the recording layer 412 with a preselected crystalline structure. In one embodiment, the first preselected level is about 20% and corresponds to an overall damping of the media 404 of about 5%. In several embodiments, the first material is a rare earth dopant such as Ho or Ho oxide. In one such case, the concentration of Ho is about 0.5 percent or greater. In other embodiments, the first material is a rare earth dopant that includes one or more materials from the group consisting of Pr, Nd, Pm, Sm, Eu, Gd, Tb, Dy, Ho, Er, Tm, Yb, Lu, Hf, or other suitable dopants.

In several embodiments, the first material or doping material is deposited such that portions of the doping material are disposed between the grains of the recording layer 412. In one such embodiment, the volume average of damping is segmented such that about one third is contributed by the doped underlayer 414 and about two thirds is contributed by the recording layer 412 (e.g., by the doping material between the grains). In several embodiments, the rare earth dopant for the doped underlayer 414 is selected for its ability to increase intrinsic damping and its capability to avoid disturbing a desired crystalline structure of the recording layer 412.

The other layers of the damped magnetic media 404 can function, and be made of the same materials, as described above for the damped magnetic media 204 of FIG. 2a.

Figure 3B:
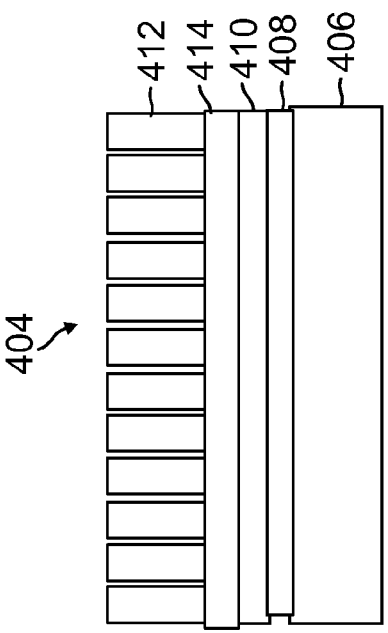
FIG. 3b is a side view of a damped magnetic media with a non-continuous doped underlayer positioned beneath a magnetic recording layer that can be used in conjunction with the read/write head of FIG. 1 in accordance with one embodiment of the invention.

FIG. 3b is a side view of a damped magnetic media 504 with a non-continuous doped underlayer 514 positioned beneath a magnetic recording layer 512 that can be used in conjunction with the read/write head of FIG. 1 in accordance with one embodiment of the invention. The damped magnetic media 504 has a stacked multi-layer structure with a bottom heat sink layer 506, a thermal resistor layer 508 on the heat sink layer 506, a growth layer 510 on the thermal resistor layer 508, the non-continuous (e.g., discrete) doped underlayer 514 on the growth layer 510, and the recording layer 512 on the continuous doped underlayer 514. In some embodiments, the stacked structure further includes a capping layer on the recording layer 512.

The recording layer 512 includes a number of discrete grains oriented in a vertical direction and can be made of FePt, CoCrPt, CoPt, CoPtNi, and/or other suitable materials. In several embodiments, the doped underlayer 514 includes a number of discrete grains in vertical correspondence with the grains of the recording layer 512.

The other layers of the damped magnetic media 504 can function, and be made of the same materials, as described above for the damped magnetic media 204 of FIG. 2a.

Figure 4:
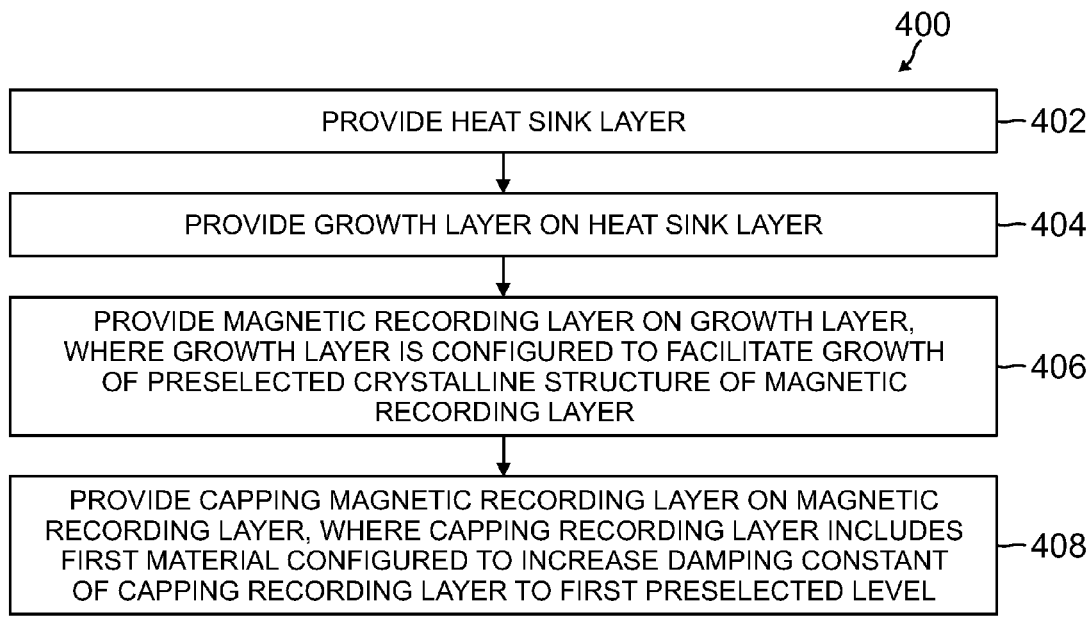
FIG. 4 is a flowchart of a process for forming a damped magnetic media with a doped capping layer positioned on a magnetic recording layer in accordance with one embodiment of the invention.

FIG. 4 is a flowchart of a process 400 for forming a damped magnetic media with a doped capping layer positioned on the recording layer in accordance with one embodiment of the invention. In particular embodiments, the process 400 can be used to form the damped magnetic media of FIGS. 2a and 2b. The process first provides (402) a heat sink layer. In some embodiments, the heat sink layer is formed on a substrate (e.g., soft magnetic underlayer). The process then provides (404) a growth layer on the heat sink layer. In some embodiments, the process also provides a thermal resistor layer on the heat sink layer. In such case, the growth layer is formed on the thermal resistor layer.

The process then provides (406) a magnetic recording layer on the growth layer, where the growth layer is configured to facilitate a growth of a preselected crystalline structure of the magnetic recording layer. The process then provides (408) a capping magnetic recording layer on the magnetic recording layer, where the capping recording layer includes a first material configured to increase a damping constant of the capping recording layer to a first preselected level. In some embodiments, the process also provides an exchange coupling layer on the magnetic recording layer. In such case, the capping magnetic recording layer is formed on the exchange coupling layer.

In a number of embodiments, the process can use suitable deposition processes (e.g., sputtered deposition and/or other physical vapor deposition methods known in the art) known in the art to provide the various layers.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 5:
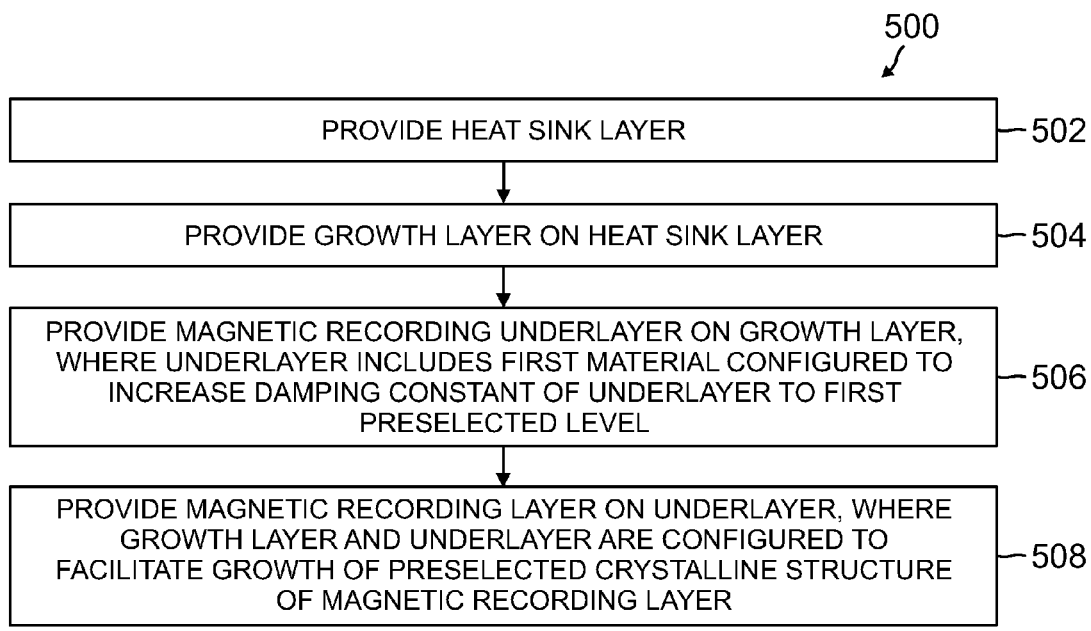
FIG. 5 is a flowchart of a process for forming a damped magnetic media with a doped underlayer positioned beneath a magnetic recording layer in accordance with one embodiment of the invention.

FIG. 5 is a flowchart of a process 500 for forming a damped magnetic media with a doped underlayer positioned beneath the recording layer in accordance with one embodiment of the invention. In particular embodiments, the process 500 can be used to form the damped magnetic media of FIGS. 3a and 3b. The process first provides (502) a heat sink layer. In some embodiments, the heat sink layer is formed on a substrate (e.g., soft magnetic underlayer). The process then provides (504) a growth layer on the heat sink layer. In some embodiments, the process also provides a thermal resistor layer on the heat sink layer. In such case, the growth layer is formed on the thermal resistor layer.

The process then provides (506) a magnetic recording underlayer on the growth layer, where the underlayer includes a first material configured to increase a damping constant of the underlayer to a first preselected level. The process then provides (508) a magnetic recording layer on the underlayer, where the growth layer and the underlayer are configured to facilitate a growth of a preselected crystalline structure of the magnetic recording layer. In some embodiments, the process also provides a capping layer on the magnetic recording layer. In some embodiments, the magnetic recording layer includes a number of discrete magnetic grains separated by gaps. In one such case, the process also deposits additional amounts of the first material in the gaps in the recording layer, thereby doping the recording layer in addition to the underlayer.

In a number of embodiments, the process can use suitable deposition processes (e.g., sputtered deposition and/or other physical vapor deposition methods known in the art) known in the art to provide the various layers.

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A magnetic media structure for heat assisted magnetic recording, the media structure comprising:
    a heat sink layer;
    a growth layer on the heat sink layer;
    a magnetic recording layer on the growth layer, wherein the growth layer is configured to facilitate a growth of a preselected crystalline structure of the magnetic recording layer; and
    a capping magnetic recording layer on the magnetic recording layer, the capping magnetic recording layer comprising a first material configured to increase a damping constant of the capping recording layer to a first preselected level,
    wherein the magnetic recording layer comprises a plurality of discrete magnetic grains separated by a plurality of gaps; and
    wherein the plurality of gaps are at least partially filled with the first material.

2. The media structure of claim 1, wherein the first material comprises a rare earth dopant.

3. The media structure of claim 2, wherein the rare earth dopant comprises Ho.

4. The media structure of claim 2, wherein the rare earth dopant comprises a material selected from the group consisting of Pr, Nd, Pm, Sm, Eu, Gd, Tb, Dy, Ho, Er, Tm, Yb, Lu, and Hf.

5. The media structure of claim 1, wherein the capping magnetic recording layer comprises a substantially continuous structure.

6. The media structure of claim 1:
    wherein the magnetic recording layer comprises a plurality of discrete magnetic grains; and
    wherein the capping magnetic recording layer comprises a plurality of grains in vertical correspondence with the plurality of discrete magnetic grains.

7. The media structure of claim 1, further comprising an exchange coupling layer positioned between the capping magnetic recording layer and the magnetic recording layer.

8. The media structure of claim 1, further comprising a thermal resistor layer positioned between the heat sink layer and the growth layer.

9. The media structure of claim 1:
    wherein the magnetic recording layer comprises FePt;
    wherein the growth layer comprises MgO; and
    wherein the capping magnetic recording layer comprises a material selected from the group consisting of Fe, Pt, Co, Cr, Ni, and combinations thereof.

10. The media structure of claim 1, further comprising an underlayer comprising a soft magnetic material, wherein the heat sink layer is positioned on the soft underlayer.

11. The media structure of claim 1, wherein the first material increases a damping constant of the capping recording layer to a first preselected level.

12. A magnetic media structure for heat assisted magnetic recording, the media structure comprising:
    a heat sink layer;
    a growth layer on the heat sink layer;
    a magnetic recording underlayer on the growth layer, the underlayer comprising a first material configured to increase a damping constant of the underlayer to a first preselected level; and
    a magnetic recording layer on the underlayer, wherein the growth layer and the underlayer are configured to facilitate a growth of a preselected crystalline structure of the magnetic recording layer,
    wherein the magnetic recording layer comprises a plurality of discrete magnetic grains separated by a plurality of gaps; and
    wherein the plurality of gaps are at least partially filled with the first material.

13. The media structure of claim 12, wherein the first material comprises a rare earth dopant.

14. The media structure of claim 13, wherein the rare earth dopant comprises Ho.

15. The media structure of claim 13, wherein the rare earth dopant comprises a material selected from the group consisting of Pr, Nd, Pm, Sm, Eu, Gd, Tb, Dy, Ho, Er, Tm, Yb, Lu, and Hf.

16. The media structure of claim 12, wherein the underlayer comprises a substantially continuous structure.

17. The media structure of claim 12:
    wherein the magnetic recording layer comprises a plurality of discrete magnetic grains; and
    wherein the underlayer comprises a plurality of grains in vertical correspondence with the plurality of discrete magnetic grains.

18. The media structure of claim 12, further comprising a thermal resistor layer positioned between the heat sink layer and the growth layer.

19. The media structure of claim 12:
    wherein the magnetic recording layer comprises FePt;
    wherein the growth layer comprises MgO; and
    wherein the underlayer comprises a material selected from the group consisting of Fe, Pt, Co, Cr, Ni, and combinations thereof.

20. The media structure of claim 12, further comprising a second underlayer comprising a soft magnetic material, wherein the heat sink layer is on the second underlayer.

21. The media structure of claim 12, wherein the first material increases a damping constant of the capping recording layer to a first preselected level.

22. A method for increasing a damping constant of a magnetic media structure for heat assisted magnetic recording, the method comprising:
    providing a heat sink layer;
    providing a growth layer on the heat sink layer;
    providing a magnetic recording layer on the growth layer, wherein the growth layer is configured to facilitate a growth of a preselected crystalline structure of the magnetic recording layer; and providing a capping magnetic recording layer on the magnetic recording layer, the capping recording layer comprising a first material configured to increase a damping constant of the capping recording layer to a first preselected level, wherein the magnetic recording layer comprises a plurality of discrete magnetic grains separated by a plurality of gaps; and wherein the plurality of gaps are at least partially filled with the first material.

23. The method of claim 22, wherein the first material comprises a rare earth dopant.

24. The method of claim 23, wherein the rare earth dopant comprises Ho.

25. The method of claim 23, wherein the rare earth dopant comprises a material selected from the group consisting of Pr, Nd, Pm, Sm, Eu, Gd, Tb, Dy, Ho, Er, Tm, Yb, Lu, and Hf.

26. The method of claim 22, wherein the capping magnetic recording layer comprises a substantially continuous structure.

27. The method of claim 22:
wherein the magnetic recording layer comprises a plurality of discrete magnetic grains; and
wherein the capping magnetic recording layer comprises a plurality of grains in vertical correspondence with the plurality of discrete magnetic grains.

28. The method of claim 22, further comprising an exchange coupling layer positioned between the capping magnetic recording layer and the magnetic recording layer.

29. The method of claim 22, further comprising a thermal resistor layer positioned between the heat sink layer and the growth layer.

30. The method of claim 22:
wherein the magnetic recording layer comprises FePt;
wherein the growth layer comprises MgO; and
wherein the capping magnetic recording layer comprises a material selected from the group consisting of Fe, Pt, Co, Cr, Ni, and combinations thereof.

31. The method of claim 22, further comprising an underlayer comprising a soft magnetic material, wherein the heat sink layer is positioned on the soft underlayer.

32. The method of claim 22, wherein the first material increases a damping constant of the capping recording layer to a first preselected level.

33. A method for increasing a damping constant of a magnetic media structure for heat assisted magnetic recording, the method comprising:

providing a heat sink layer;
providing a growth layer on the heat sink layer;
providing a magnetic recording underlayer on the growth layer, the underlayer comprising a first material configured to increase a damping constant of the underlayer to a first preselected level; and
providing a magnetic recording layer on the underlayer, wherein the growth layer and the underlayer are configured to facilitate a growth of a preselected crystalline structure of the magnetic recording layer, wherein the magnetic recording layer comprises a plurality of discrete magnetic grains separated by a plurality of gaps; and wherein the plurality of gaps are at least partially filled with the first material.

34. The method of claim 33, wherein the first material comprises a rare earth dopant.

35. The method of claim 34, wherein the rare earth dopant comprises Ho.

36. The method of claim 34, wherein the rare earth dopant comprises a material selected from the group consisting of Pr, Nd, Pm, Sm, Eu, Gd, Tb, Dy, Ho, Er, Tm, Yb, Lu, and Hf.

37. The method of claim 33, wherein the underlayer comprises a substantially continuous structure.

38. The method of claim 33:
wherein the magnetic recording layer comprises a plurality of discrete magnetic grains; and
wherein the underlayer comprises a plurality of grains in vertical correspondence with the plurality of discrete magnetic grains.

39. The method of claim 33, further comprising a thermal resistor layer positioned between the heat sink layer and the growth layer.

40. The method of claim 33:
wherein the magnetic recording layer comprises FePt;
wherein the growth layer comprises MgO; and
wherein the underlayer comprises a material selected from the group consisting of Fe, Pt, Co, Cr, Ni, and combinations thereof.

41. The method of claim 33, further comprising a second underlayer comprising a soft magnetic material, wherein the heat sink layer is on the second underlayer.

42. The method of claim 33, wherein the first material increases a damping constant of the capping recording layer to a first preselected level.

* * * * *